3,406,144
STABILISED OLEFIN POLYMER COMPOSITIONS
Brian Arthur Marshall, Hitchin, England, assignor to Imperial Chemical Industries Limited, London, England, a corporation of Great Britain
No Drawing. Filed Jan. 28, 1966, Ser. No. 523,572
Claims priority, application Great Britain, Feb. 17, 1965, 6,827/65
9 Claims. (Cl. 260—45.8)

ABSTRACT OF THE DISCLOSURE

A composition comprising a solid olefin polymer and from 0.01 to 2%, by weight of the composition, of 9,10-dihydroanthracene or 9,10-dihydroacridine. The polymers may be used in shaped articles (including granules) formed from the said composition, in the shaping of which the composition has been heated to a high temperature, particularly a temperature above its melting point and within the range 200–350° C. Usually from 0.05 to 0.25% by weight of the dihydroanthracene or dihydroacridine is sufficient.

---

This invention relates to stabilised solid olefine polymer compositions.

Solid olefine polymers, by which we mean both homopolymers of aliphatic (including cycloaliphatic) mono-α-olefinic hydrocarbons having at least three carbon atoms, for instance propylene, butene-1,3-methyl butene-1, 3-methyl pentene-1, 4-methyl pentene-1, 4,4-dimethyl pentene-1, 3-methyl hexene-1, 4-methyl hexene-1, 5-methyl hexene-1, 5,5-dimethyl hexene-1 and vinylcyclohexane, and copolymers of the said hydrocarbons with each other or with ethylene (hereinafter referred to as "solid olefine polymers as hereinbefore defined," or more briefly, as "solid olefine polymers"), are materials useful for various applications as plastics or as elastomers, depending on their physical properties.

This invention is particularly, but not exclusively, concerned with solid olefine polymers melting above 150° C. Such polymers are generally of regular steric structure and are generally prepared by so-called "low-pressure" methods using catalysts derived from, typically, a reducing metal or metal hydride or metal alkyl or metal alkyl halide which is reacted together with a transition metal compound in one or more stages.

In the course of their manufacture or subsequent use these materials are normally subjected to high temperatures.

It is generally found that these materials exhibit a progressive deterioration in physical properties when they are thus subjected, the nature of which depends upon whether or not oxygen is present and upon the temperature.

Since the melting or softening points and the upper service temperatures of most of the earlier solid olefin polymers, e.g., polypropylene, ethylene/propylene copolymers or polybutene-1 are below 200° C. it has been usual to carry out tests on the ageing behaviour of these materials at temperatures below 200° C., commonly at 140–160° C. with free access of air (the "oven-ageing test"). Under these conditions the progressive uptake of oxygen by the polymer can be demonstrated, and deterioration of many of the useful properties of the polymer, e.g., electrical properties, can be correlated with the oxygen content.

The onset of this attack by oxygen can be greatly retarded by the addition to the polymer of antioxidants, and the service life of articles made from the polymer thereby greatly increased. For most applications, therefore, solid olefine polymers contain antioxidants.

Solid olefine polymers usually give melts of high viscosity, so that it is desirable for unhindered flow of the melt that melt fabrication, e.g., injection moulding and extrusion, should be carried out at temperatures considerably above the melting point.

Thus, isotactic polypropylene which has a melting point in the range 165–176° C., depending on its purity and stereoregularity, is commonly fabricated at temperatures of 200–300° C., and poly-4-methyl pentene-1, which melts at about 246° C., is fabricated at temperatures of 250–350° C. Homopolymers of some of the olefines mentioned earlier melt at very high temperatures, e.g., 310° C. for poly-3-methyl butene-1 and 370° C. for poly-3-methyl pentene-1. It is generally more practicable to shape such high melting polymers by sintering or compression moulding, although copolymers of these and similar olefines have been found to be more tractable and may be shaped by extrusion or injection moulding at temperatures below 350° C., which is the greatest temperature that can conveniently be employed in such methods.

The conditions in such fabrication processes are very different from those in the oven-ageing test not only in the high temperatures used but also in that much less oxygen is present in the closed fabrication equipment. Deterioration in the physical properties of the fabricated article is, nevertheless, observed, if the polymer is subjected to such very high temperatures for shaping it, including any plasticising treatment which may be necessary.

Examination of polymers exhibiting such deterioration shows that their average molecular weight has been reduced, even though the uptake of oxygen has necessarily been small.

It might be thought that this high-temperature deterioration would be controllable to a practically useful extent by the same antioxidants which are used to prevent low-temperature oxidation. This is, however, not generally the case, although certain phenols and amines do have a marked effect, and it is even found that some highly efficient antioxidants (particularly certain thio-compounds) greatly increase the rate at which deterioration occurs, as shown by the much faster increase in the melt index of the polymer (extrusion rate under defined conditions, an inverse measure of molecular weight) on heating at these high temperatures.

This increase in rate is not necessarily eliminated by the use of synergistic antioxidant mixtures such as are now generally in use. Thus, in most mixtures of phenols and thio-compounds, the phenol is only moderately effective in overcoming the increase in melt index caused by the thio-compound. To increase the proportion of phenol from the usual maximum of 1:1 by weight relative to the sulphur compound, and simultaneously to decrease the proportion of, or even to eliminate the sulphur compound, would usually cause the antioxidant system to be less efficient in the oven-ageing test and would increase the danger of staining.

Full advantage cannot, therefore, be taken of many highly efficient modern antioxidant systems owing to the reduction in molecular weight which they cause (or fail to prevent) at fabrication temperatures.

It is an object of the present invention to reduce substantially the rate of increase in melt index of soild olefine polymers at high temperatures, e.g., above their melting points, particularly within the range 200–350° C., i.e., a range covering that normally used in fabricating such polymers, without interfering with their stability to oxidation at lower temperatures or causing appreciable staining. For convenience this increase in melt index will be referred to as melt degradation, since this is a commonly used term and with most polymers it is especially characteristic of the molten state, without any implication that the invention is only concerned with polymer melts. With very high-melting polymers an increase in melt index may be observed to occur below the polymer melting point, and the invention is equally concerned with preventing or reducing this increase in, for example, the production of sintered articles from such a polymer.

Accordingly, the present invention provides a composition comprising a solid olefin polymer as hereinbefore defined and from 0.01 to 2%, by weight of the composition, of 9,10-dihydroanthracene or 9,10-dihydroacridine.

These two compounds have the formulae:

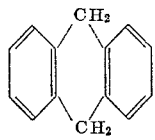

and

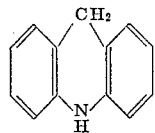

respectively.

The invention also provides shaped articles (including granules) formed from the said composition, in the shaping of which the composition has been heated to a high temperature, particularly a temperature above its melting point and within the range 200–350° C., and also a process for the production of shaped articles (including granules) in which the said composition is heated to such a temperature and is then shaped.

Usually from 0.05 to 0.25% by weight of the dihydroanthracene or dihydroacridine is sufficient. We prefer to use 9,10-dihydroanthracene because it gives polymer compositions of better colour. 9,10-dihydroacridine is sometimes found to give yellowed compositions.

Antioxidants for solid olefine polymers are generally chosen from phenols, organic sulphur compounds (particularly thiodialkanoic esters and sulphur-containing heterocyclic compounds), organic phosphorus compounds and, less frequently because of the staining which they cause, aromatic amines.

Other materials which may be present include cross-linking agents, blowing agents, plasticisers, fillers, nucleating agents, slip agents, antistatic agents, pigments, light stabilisers, organic phosphorus compounds, some of which are antioxidants (also often added to reduce staining by antioxidants), metal deactivators, and materials of the type used as stabilisers for polyvinyl chloride, e.g., basic inorganic materials and other HCl acceptors, for instance, epoxides and metal soaps. See, for instance, the review in Chemistry and Industry, Aug. 15, 1964, pages 1442–1455.

Metal soaps, e.g., calcium and zinc stearates, also function as lubricants and may improve the affinity of the polymer for dyes.

It is usually desirable to use mixtures of phenols and thiodialkanoates or similar sulphur compounds because of the synergism between these antioxidants (in increasing the oxidation induction period) which is obtained. However, as will be seen from the examples, the addition of the sulphur compound to the phenol may increase the rate of melt degradation by a factor of two or three or even more, and this may sometimes to too heavy a price to pay for the increased life of the polymer at lower temperatures, e.g., 140° C.

We have found that by the addition of small amounts of the dihydroanthracene or dihydroacridine the rate of melt degradation can be greatly lowered, amounting in most cases when antioxidants are present, to a several-fold reduction compared with the rate obtained using the antioxidants or antioxidant mixtures alone, in the same way as the rate is lowered by the addition of the dihydroanthracene or dihydroacridine to antioxidant-free polymer.

The invention thus renders practicable the use of antioxidants or antioxidant mixtures which, although effective at lower temperatures, are not desirable for use where the fabrication of the polymer involves long exposure to temperatures causing melt degradation.

The dihydroanthracene or dihydroacridine may be added at any convenient stage before or at the point where its protective action needs to be exerted. It it is desired to add it during polymerisation care should be taken to see that it does not react undesirably with the catalyst and is not removed in any polymerisation diluent or during any purification treatment of the polymer.

For these reasons it will generally be convenient to add the dihydroanthracene or dihydroacridine after polymerisation and after any purification treatment, very suitably together with the antioxidant or other additives if these are to be used, by any of the methods normally used to incorporate additives in solid olefine polymers, subject to the proviso below, e.g., by the addition of a solution of the additive or additives in a volatile solvent to the polymer powder, followed by evaporation of the solvent; by dry mixing; by milling; extrusion compound; Banbury treatment or the like. Due regard must, of course, be paid to the stability of these methods for stabilising any particular olefine polymer, since if its melting point is sufficiently high it may be difficult to prevent substantial degradation occurring, in those processes in which the polymer is melted, before the dihydroanthracene or dihydroacridine is fully incorporated.

With the lower-melting polymers, e.g., isotactic polypropylene, any of these methods can be safely employed.

With polymers melting at above about 240° C., e.g., polymers of 4-methyl pentene-1, the additive is more safely incorporated if it is first mixed with the polymer at lower temperatures, e.g., by the solvent method or by dry mixing, before the polymer is exposed to temperatures favouring rapid degradation.

A masterbatch technique may be found convenient, particularly if only small amounts, e.g., 0.01–0.05% of dihydroanthracene or dihydroacridine by weight, are to be incorporated.

As antioxidants, if these are to be used, we prefer the mixtures of bis- or tris-phenols with thiodialkanoates of British Patent No. 951,931, particularly mixtures of (a) the condensate of one molecule of crotonaldehyde or cinnamaldehyde with three molecules of 3-methyl-6-tertiary butyl phenol (i.e., 1,1,3-tris(2-methyl-4-hydroxy-5-tertiary butyl-phenyl)butane) or 3-methyl-6-tertiary octyl phenol, and (b) dilauryl, dicetyl, dimyristyl or distearyl thiodipropionates or thiodibutyrates.

Of these, the thiodibutyrates have the advantage of a lower rate of melt degradation and usually a rather more powerful synergistic antioxidant action in such mixtures, although the thiodiproprionates are more commonly used since they are more readily available commercially.

The thiodialkanoates may be replaced by other sulphur compounds known to show synergism with phenols, e.g., zinc dibutyl dithiocarbamate, zinc dinonyl dithiophosphate or trialkyl trithiophosphites, and especially the dialkyl thioethers some of which, particularly dihexadecyl thioether, also have a low tendency to cause melt degradation, even if not quite so low as the best of the thiodialkanoates. Other phenols may also be used. See, for instance, British Patent Nos. 951,932, 951,933, 951,934 and 951,936.

All these mixtures containing a sulphur-free phenol together with a sulphur compound normally give a lower rate of melt degradation than do mixtures containing thiobisphenols, and are therefore preferred.

4,4'-thiobis(3-methyl-6-tertiary butyl phenol), however, is such a well known and commonly used antioxidant that it is a most useful feature of the present invention that it greatly alleviates one of the principle disadvantages of this and of other thiobisphenols.

An organic phosphite, e.g., tris(nonylphenyl)phosphite or a dialkyl pentaerythritol phosphite, may, if desired, be added to reduce staining. In some cases a favourable effect on melt degradation rate is observed.

For particular polymers other antioxidant systems may be preferred. Thus a very suitable antioxidant for 4-methyl pentene-1 polymers is that sold as "Irganox" 1093 (registered trade mark) and believed to be an organic phosphonate. With this antioxidant, also, the rate of melt degradation is sharply reduced by the addition of small amounts of the dihydroanthracene or dihydroacridine. Other particularly suitable antioxidants for 4-methyl pentene-1 polymers are "Ionox" 330 which is 1,3,5-trimethyl-2,4,6-tris(3',5' - ditertiarybutyl - 4' - hydroxybenzyl)benzene; and "Irganox" 1076 which is believed to be the octadecyl ester of $\beta$-(3,5-ditertiarybutyl-4-hydroxyphenyl) propionic acid.

As to quantities, the antioxidant or antioxidant mixture, if used, is usually present in a total proportion of up to 1% by weight, while the effect of the dihydroanthracene or dihydroacridine increases rapidly over the range 0.01–0.1% and less rapidly thereafter.

A polymer having the best balance of properties for the most economical use of the dihydroanthracene or dihydroacridine will usually contain 0.05–0.25% by weight of this additive.

Other additives, particularly phenols, are known which give a low rate of melt degradation, e.g., the well known antioxidant 2,6 - ditertiarybutyl - 4 - methylphenol, which, however, is too volatile and may cause marked yellow staining of the polymer. This melt stabilising action is not maintained in a mixture containing a sulphur compound as synergist, without which phenol is of little practical use as an antioxidant.

9,10-dihydroanthracene does not cause appreciable staining and does not interfere with normal antioxidant action at lower temperatures.

The following examples illustrate our invention.

In the examples the following abbreviations and registered trade marks are used:

RA1093—The original designation of an antioxidant under the registered trade mark "Irganox" 1093. Believed to be a hydroxyaryl phosphonate ester.
DHA—9,10 dihydroanthracene.
DLTP—Dilauryl $\beta,\beta'$-thiodipropionate.
3M6B/CA—A condensate of three molecules of 3-methyl-6-tertiary butyl phenol with one molecule of crotonaldehyde.
"Ionox" 330—1,3,5 - trimethyl-2,4,6-tris(3',5' - ditertiarybutyl-4'-hydroxybenzyl)benzene.

EXAMPLES 1 TO 11

A copolymer of 98% 4-methyl pentene-1 and 2% n-decene-1 by weight, prepared by the method of B.P. 942,297, of melt-index 40 measured by the ASTM method 1238–56T modified in that a 5 kg. weight was used instead of that specified for causing extrusion and that the temperature of the polymer was maintained at 260° C., was mixed by tumbling with antioxidants and/or with 9,10-dihydroanthracene or other hydrocarbons for comparison, as specified below, the additives being added as a solution in methylene chloride to the polymer powder and the methylene chloride being removed by evaporation.

The compositions were pressed into ⅛ inch thick sheets at 265–270° C., and were then quenched and cut into strips.

The strips (about 5 gms.) were fed to a melt indexer, as used for polythene, fitted with a piston height recorder and maintained at 320° C., with an applied load of 1 kg.

A further sample of the same polymer containing no additives was similarly prepared and tested.

Tangents to the recorded curve were drawn at regular intervals and their slope determined.

The viscosity $\eta$ was calculated in each case using the relation $\eta = A/M$ where M is the slope and A is a factor proportional to the pressure applied to the melt and to the fourth power of the radius of the die, and inversely proportional to the length of the die, the square of the radius of the barrel of the melt-indexer and the speed of rotation of the recording drum.

$1/\log \eta$ was then plotted against time $t$. The points fell on the straight line $1/\log \eta = 1/\log \eta_0 + kt$, the slope of which, $k$, is the degradation rate constant.

The degradation rate constants $(k)$ were as follows:

TABLE I

| Example [1] | Additive | $10^3 k$ at 320° C. |
|---|---|---|
| A | 0.25% RA1093 | 16.3 |
| 1 | 0.25% RA1093+0.01% DHA | 1.5 |
| 2 | 0.25% RA1093+0.1% DHA | 1.25 |
| 3 | 0.25% RA1093+0.25% DHA | 1.9 |
| B | 0.25% RA1093+0.1% diphenyl | 10 |
| C | 0.25% RA1093+0.25% diphenyl | 16.5 |
| D | 0.25% RA1093+0.1% acenaphthene | 8.7 |
| E | 0.25% RA1093+0.25% acenaphthene | 6.3 |
| F | 0.5% RA1093 | 6.6 |
| 4 | 0.5% RA1093+0.25% DHA | 0.62 |
| 5 | 0.5% RA1093+0.5% DHA | 0.55 |
| G | 0.25% DLTP | 28.2 |
| 6 | 0.25% DLTP+0.25% DHA | 2.55 |
| H | 0.25% 3M6B/CA+0.25% DLTP | 9.5–12 |
| 7 | 0.25% 3M6B/CA+0.25% DLTP+0.25% DHA | 2.55 |
| I | 0.25% "Ionox" 330 | 2.89 |
| 8 | 0.25% "Ionox" 330+0.1% DHA | 0.63 |
| J | 0.25% "Ionox" 330+0.25% DLTP | 4.9 |
| 9 | 0.1% "Ionox" 330+0.25% DLTP+0.1% DHA | 1.02 |
| 10 | 0.25% DHA | 0.6 |
| 11 | 0.5% DHA | 1.15 |
| K | 0.25% triphenylmethane | 22 |
| L | No additive | 22 |

[1] Examples are numbered; comparative experiments are lettered.

EXAMPLES 12 TO 21

Polypropylene of melt index 30 measured at 190° C. by the ASTM method modified in that a 10 kg. weight was used instead of that specified for causing extrusion, was mixed with antioxidants and/or with 9,10-dihydroanthracene or 9,10-dihydroacridine, as specified below, by milling at 190° C.

The approximately ⅛ inch thick crêpes thus obtained were then allowed to cool, and cut into strips.

The strips were fed to a melt indexer, as used for polythene, fitted with a piston height recorder and maintained at 320° C., with an applied load of 1 kg.

The values of $k$, calculated as in Table 1, were as follows:

| Example [1] | Additive | $10^3 k$ at 320° C. |
|---|---|---|
| M | 0.25% 3M6B/CA | 2.2 |
| N | 0.25% DLTP | 21.0 |
| O | 0.25% DLTP+0.25% 3M6B/CA | 9.8 |
| 12 | 0.25% 3M6B/CA+0.25% DHA | 0.6 |
| 13 | 0.25% DLTP+0.25% DHA | 2.4 |
| 14 | 0.25% DLTP+0.25% 3M6B/CA+0.25% DHA | 3.8 |
| 15 | 0.25% DLTP+0.25% 3M6B/Cb+0.25% 9,10-dihydroacridine. | 1.7 |
| 16 | 0.25% DHA | 0.65 |
| 17 | 0.5% DHA | 0.25 |
| P | 0.25% 4,4'-thiobis(3-methyl-6-tertiary-butylphenol). | 72 |
| Q | 0.5% 4,4'-thiobis(3-methyl-6-tertiary-butylphenol). | 96 |
| 18 | 0.25% 4,4'-thiobis(3-methyl-6-tertiary-butylphenol)+0.25% DHA. | 11.4 |
| 19 | 0.5% 4,4'-thiobis(3-methyl-6-tertiary-butylphenol)+0.25% DHA. | 14.5 |
| 20 | 0.25% 4,4'-thiobis(3-methyl-6-tertiary-butylphenol)+0.5% DHA. | 8.5 |
| 21 | 0.5% 4,4'-thiobis(3-methyl-6-tertiary-butylphenol)+0.5% DHA. | 11.5 |
| R | No additive | [2] 3.9 |

[1] Examples are numbered; comparative experiments are lettered.
[2] Average of nine results.

EXAMPLES 22 TO 24

A copolymer of the same composition by weight as that of Example 1 but of melt index 15 instead of 40, was mixed, as before, with the antioxidant RA1093 and (except for a comparison sample) with 9,10-dihydroanthracene, as set out below.

The compositions were extruded into laces on a ¾ inch Iddon extruder having a 15:1 high compression screw rotating at 90 r.p.m., the die temperature being 280° C.

The melt indices of the laces were measured in the same way as was the melt index of the polymer in Table I.

TABLE III

| Example[1] | Additive | Melt Index |
|---|---|---|
| S | 0.25% RA1093 | 33 |
| 22 | 0.25% RA1093+0.05% DHA | 23 |
| 23 | 0.25% RA1093+0.1% DHA | 20 |
| 24 | 0.25% RA1093+0.15% DHA | 18 |

[1] Examples are numbered; comparative experiments are lettered.

It will be seen that the increase in melt index is very substantially reduced by the addition of small amounts of the dihydroanthracene.

EXAMPLES 25 AND 26

A copolymer of 4-methyl pentene-1 with 2% by weight of n-decene-1 having an initial MFI of 21, was treated as in Examples 22 to 24.

The results were as follows:

TABLE IV

| Example[1] | Additive | Melt Index |
|---|---|---|
| T | 0.25% RA1093 | 77 |
| 25 | 0.25% RA1093+0.25% DHA | 24 |
| 26 | 0.25% RA1093+0.25% 9,10-dihydroacridine | 21 |

[1] Examples are numbered; comparative experiments are lettered.

EXAMPLES 27 AND 28

Two samples of a copolymer of 92.5% 4-methyl pentene-1 and 7.5% n-hexene-1 by weight and of melt index 22 measured by the method of Example 1, were mixed with antioxidants and (except for comparison samples) 9,10-dihydroanthracene, as set out below, by the method of Table I.

The compositions were extruded into laces on a 1¼ inch Bridge extruder using a nylon screw (16:1 compression) rotating at 78 r.p.m., the die temperature being 280° C.

The melt indices of the laces were measured as in Table I.

The results were as follows:

TABLE V

| Example[1] | Additive | Melt Index |
|---|---|---|
| U | 0.25% "Ionox" 330 | 33 |
| 27 | 0.25% "Ionox" 330+0.1% DHA | 20 |
| V | 0.1% 3M6B/CA+0.25% DLTP | 58 |
| 28 | 0.1% 3M6B/CA+0.25% DLTP+0.1% DHA | 19 |

[1] Examples are numbered; comparative experiments are lettered.

The apparent decrease in melt index in Experiments 27 and 28 to below that of the original polymer is to be attributed to experimental error, but the difference between the compositions containing DHA and the compositions not containing DHA is in each case much greater than could be accounted for by error.

It will be observed, on comparing comparative experiments S and U, that the two antioxidants RA1093 and "Ionox" 330 appear at first sight to be more similar in their effect on the melt index than might have been expected from the widely different rates recorded in Table I (16.3 and 2.89 respectively for $k \times 10^3$). We believe this may, at least partly, be attributed to:

(a) The inherently more rapid melt degradation of the higher melt index polymer of Table V;

(b) The lower temperature (280° C.) used in Tables III and V. The higher temperature (320° C.) of Table I accentuates the differences between antioxidants. (The dwell times in Tables III and V were similar—about 4 minutes); and (c) The different chemical composition of the two copolymers.

EXAMPLES 29 AND 30

The compositions of Table V, after being extruded into laces, were injection moulded to give plaques 2¼ inches square by ⅛ inch thick, on a 2 oz. Peco ram machine, the barrel temperature being 280–290° C., the nozzle temperature 260° C. and the mould temperature 70° C. The cycle times were: ram forward—25 secs.; ram retracted—15 secs. The dwell time was about 3 minutes.

The injection mouldings were cut up and their melt indices determined as in Table I.

The results were as follows:

TABLE VI

| Example[1] | Additive | Melt Index |
|---|---|---|
| W | 0.25% "Ionox" 330 | 78 |
| 29 | 0.25% "Ionox" 330+0.1% DHA | 33 |
| X | 0.1% 3M6B/CA+0.25% DLTP | 134 |
| 30 | 0.1% 3N6B/CA+0.25% DLTP 0.1% DHA | 24 |

[1] Examples are numbered; comparative experiments are lettered.

In none of the above examples was any appreciable discoloration caused by 9,10-dihydroanthracene.

When the compositions of the examples were subjected to the oven-ageing test at 140° C. it was found that the lives observed were those which would have been expected from the quantities of the antioxidants present, and that no appreciable antioxidant or pro-oxidant activity of the dihydroanthracene could be shown.

The above results show strikingly the effect of 9,10-dihydroanthracene and 9,10-dihydroacridine in reducing melt degradation of solid olefine polymers, either alone or in the presence of antioxidants.

Essentially similar results, qualitatively, are obtained with the dihydroanthracene and dihydroacridine in other solid olefine polymers and together with other antioxidants, although some olefine polymers are more susceptible to melt degradation than others (the rate for a particular polymer additionally being greater the greater the initial melt index of the polymer), and some antioxidants are more liable to cause or are less effective in reducing melt degradation than others.

It is thus not possible to specify, as a generality applicable to all olefine polymers, at what temperature within the range 200–350° C. melt degradation begins to be serious, since this is a matter for trial in any particular case. With most commercial grades of isotactic polypropylene, for example and with 4-methyl pentene-1 polymers, degradation begins to be serious at about 260° C., and it is to be expected that it will be equally serious with other solid olefine polymers at or above this temperature.

The effect of 9,10-dihydroanthracene is seen to be very much greater than that of the hydrocarbons diphenyl, acenaphthene, or triphenylmethane. Acenaphthene is structurally very similar to 9,10-dihydroanthracene.

The compositions of the invention are particularly suitable for the production of shaped articles, e.g., granules, films, sheet, filaments, tubes, profiles and other extrudates, injection or compression mouldings, coatings, laminates and the like by any of the methods normally applicable to the polymers they comprise, owing to their great stability of melt index. This not only facilitates production, since the power required to drive screws, plungers, etc., is more nearly constant, but also leads to greater consistency in the mechanical properties of the shaped article.

If the compositions are to be milled in air, or if the shaped articles are to be exposed to oxidising conditions, they should contain an antioxidant.

I claim:
1. A composition comprising a solid polymer of a mono-α-olefine and from 0.01 to 2% of an additive of formula

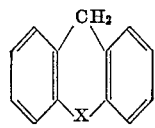

where X is selected from the group >CH$_2$ and >NH.

2. A composition according to claim 1 in which the mono-α-olefine is 4-methyl pentene-1.

3. A composition according to claim 1 in which the mono-α-olefine is propylene.

4. A shaped article formed from a composition claimed in claim 1.

5. A composition according to claim 1 which additionally comprises an antioxidant selected from the group phenols, organic sulphur compounds, organic phosphorus compounds and aromatic amines.

6. A composition according to claim 1 which additionally comprises a synergistic antioxidant mixture of a phenol and dialkyl thiodialkanoate.

7. A composition comprising a solid polymer of a mono-α-olefine and from 0.01 to 2% by weight of 9,10-dihydroanthracene.

8. A composition comprising a solid polymer of a mono-α-olefine and from 0.05 to 0.25% of 9,10-dihydroanthracene.

9. A composition comprising a solid polymer of a mono-alpha-olefin and a stabilizing amount of 9,10-dihydroanthracene.

References Cited

UNITED STATES PATENTS

| | | | |
|---|---|---|---|
| 2,985,617 | 5/1961 | Salyer et al. | 260—45.7 |
| 3,003,995 | 10/1961 | Schule | 260—45.8 |
| 3,190,852 | 6/1965 | Doyle | 260—45.85 |

FOREIGN PATENTS

| | | | |
|---|---|---|---|
| 652,730 | 5/1961 | Great Britain. | |

DONALD E. CZAJA, *Primary Examiner.*

M. J. WELSH, *Assistant Examiner.*